United States Patent [19]

Johansson et al.

[11] Patent Number: 5,185,124
[45] Date of Patent: Feb. 9, 1993

[54] DIMENSIONAL GAUGING APPARATUS FOR NUCLEAR FUEL ROD SPACER CELLS

[75] Inventors: Eric B. Johansson, Wrightsville Beach; David G. Smith, Leland, both of N.C.

[73] Assignee: General Electric Company, San Jose, Calif.

[21] Appl. No.: 836,684

[22] Filed: Feb. 18, 1992

[51] Int. Cl.⁵ ............................................. G21C 3/34
[52] U.S. Cl. ............................ 376/439; 376/438; 376/462; 376/442
[58] Field of Search .............. 376/439, 438, 462, 442, 376/443, 828, 502; 33/603, 563; 976/DIG. 103, DIG. 213

[56] References Cited

U.S. PATENT DOCUMENTS

| | | | |
|---|---|---|---|
| 2,725,636 | 12/1955 | Green | 33/143 |
| 3,225,447 | 12/1965 | Bryant | 33/143 |
| 3,345,857 | 10/1967 | Shutes et al. | 73/1 |
| 3,475,825 | 11/1969 | Creek et al. | 33/174 |
| 4,190,961 | 3/1980 | James et al. | 33/180 R |
| 4,539,738 | 9/1985 | Antol et al. | 29/467 |
| 4,670,211 | 6/1987 | Gaunt et al. | 376/245 |
| 4,728,483 | 3/1988 | Ahmed et al. | 376/258 |
| 4,777,011 | 10/1988 | Scharpenberg | 376/245 |
| 4,788,026 | 11/1988 | Widener | 376/245 |
| 4,946,587 | 8/1990 | Reeves et al. | 209/539 |
| 5,070,622 | 12/1991 | Butzin et al. | 33/793 |
| 5,110,539 | 5/1992 | Perrotti et al. | 376/439 |

Primary Examiner—Donald P. Walsh
Assistant Examiner—Meena Chelliah
Attorney, Agent, or Firm—Robert R. Schroeder

[57] ABSTRACT

To provide quality assurance inspection of the dimensional characteristics of cells to be incorporated in spacers utilized in nuclear fuel bundles to establish critical spacings between fuel rods, a cell is placed in a fixture dimensioned to gauge the outer dimensions of the cell. A fuel rod-simulating pin is then inserted through the cell to rest on fuel rod-positioning stops formed on the cell. "Go, no go" feeler gauges then check the dimensions of the gaps between the fixture and pin.

7 Claims, 3 Drawing Sheets

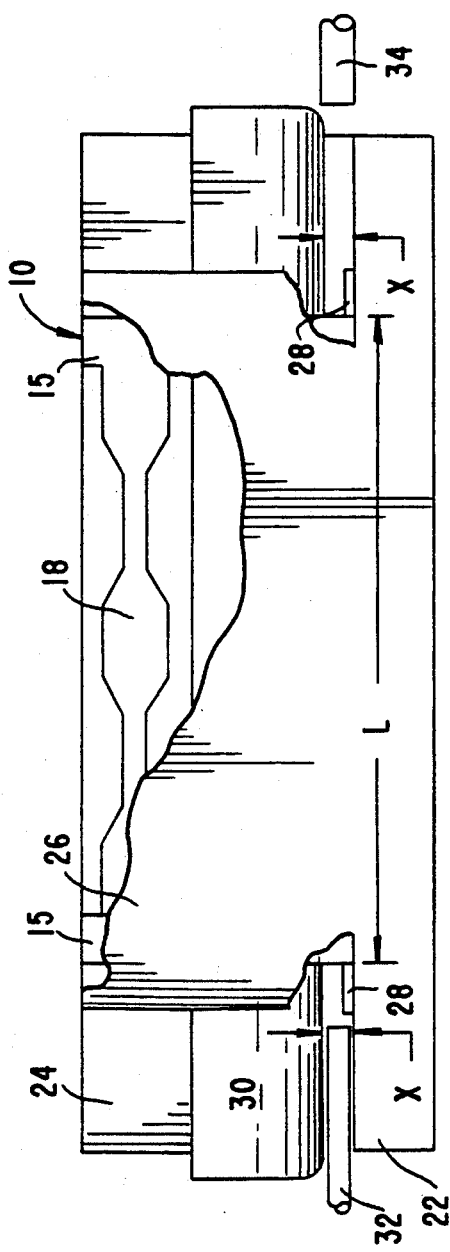
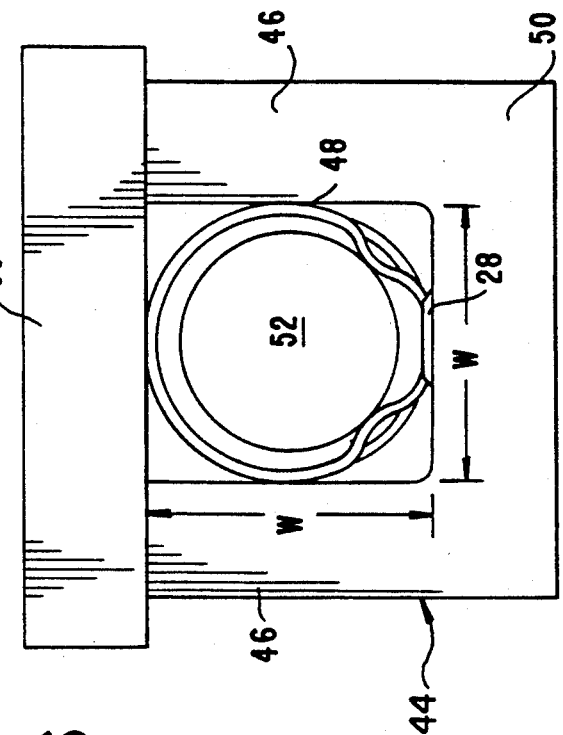
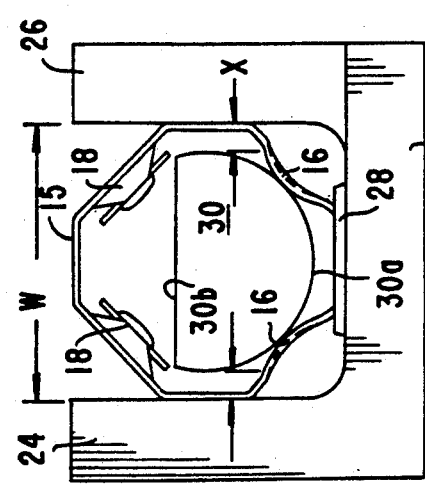
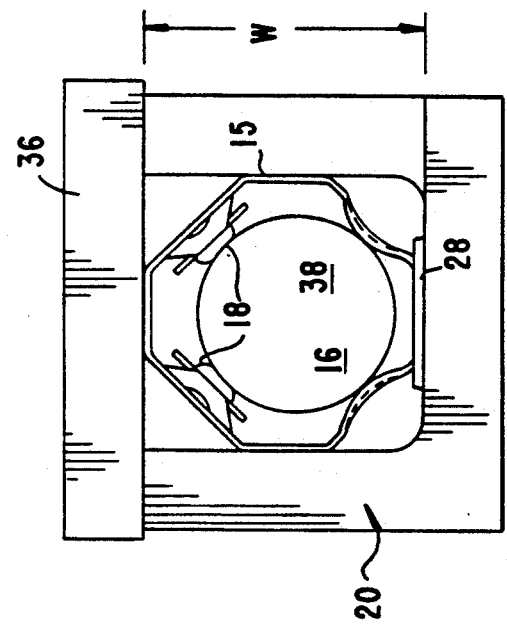
FIG.4
FIG.6
FIG.3
FIG.5

DIMENSIONAL GAUGING APPARATUS FOR NUCLEAR FUEL ROD SPACER CELLS

The present invention relates to gauging the dimensional characteristics of manufactured parts and particularly to quality assurance gauges for determining if piece parts have been manufactured in compliance with specified dimensional tolerances.

BACKGROUND OF THE INVENTION

There are numerous piece part manufacturing situations where the dimensional characteristics of the finished part are critical. That is, after a part has exited a manufacturing process, such as machining or forming, dimensional characteristics imparted thereto by the process must fall within predetermined design limits, which may have a tolerance on the order of several mils or less. When such parts are manufactured in large quantities on an automated production line basis at high piece count rates, quality assurance inspection of the parts for dimension accuracy must be performed on a frequent basis to detect process excursions, caused by, for example, worn tooling, before large quantities of unacceptable parts are manufactured.

One example of a part whose dimensional characteristics are of critical importance is the spacer cell in a nuclear fuel rod assembly or bundle. Each spacer includes a multiplicity of conjoined tubular cells arrayed in matrix or egg crate fashion, where the bore of each cell provides a passage for receiving a nuclear fuel rod. A fuel rod is centered in each cell by at least one spring acting to bias the rod against axially spaced pairs of stops formed as inwardly projecting dimpled or fluted wall segments of the cell. These stops not only determine the positions of the rods in their cells, but also the critically important spacings between fuel rods in an assembled fuel bundle. If quality assurance inspection of rod to rod spacing is performed by inserting fuel rod simulating pins into the cells of a completed spacer, considerable manufacturing effort and material expense goes for naught if it is then found that rod spacing is out of tolerance.

SUMMARY OF THE INVENTION

It is accordingly an objective of the present invention to provide apparatus for gauging the dimensional characteristics of individual cells prior to their incorporation in a nuclear fuel bundle spacer. The gauging apparatus includes a gauging fixture having a planar base and upstanding perpendicular sidewalls. The spacing between the parallel sidewalls is equal to the nominal width of a cell. The height of the sidewalls is also equal to the nominal cell width. If a cell can be placed in the fixture between the sidewalls with minimal play, its width dimension in the horizontal direction is acceptable. A plate is rested on the tops of the fixture sidewalls, and, if the cell fits between this plate and the fixture base with minimal play, its width dimension in the vertical dimension is acceptable. If the cell fits between two steps upstanding from the fixture base, its length dimension is acceptable.

To check the dimensional characteristics of the fuel rod positioning stops of a cell, a first pin is inserted through the cell to rest on the stops. This pin is of a diameter equal to the nominal diameter of a fuel rod, but is relieved so as not to be in contact with the springs of the cell. The gaps between this first pin and each of the base and two sidewalls represent one-half of the rod-to-rod spacing the cell will establish when incorporated in a spacer, and the dimensions of the gaps between the fixture base and the pin and between one fixture sidewall and the pin are checked using a pair of "go, no go" feeler gauges. If these two gaps are within prescribed tolerances, a fuel rod will be centered in the cell with acceptable spacings with all neighboring fuel rods. The first pin is replaced by a second pin whose diameter is slightly less than the fuel rod nominal diameter, so that the cell springs should just contact this second pin. If the springs in their relaxed positions, do contact the second pin, the springs are deemed capable of exerting requisite spring forces to center a fuel rod in the cell against the stops.

The invention accordingly comprises the features of construction, combination of elements and arrangement of parts, all as detailed hereinafter, and the scope of the invention will be indicated in the claims.

BRIEF DESCRIPTION OF THE DRAWINGS

For a full understanding of the nature and objectives of the present invention, reference may be had to the following detailed description taken in conjunction with the accompanying drawings, in which:

FIG. 3 is a side view partially broken away, of the gauging fixture of FIG. 2 with a cell in gauging position therein;

FIG. 4 is an end view of the gauging fixture and cell seen in FIG. 3;

FIG. 5 is an end view of the gauging fixture and cell seen in FIG. 3, with the addition of a top plate to accommodate further checking of cell dimensional characteristics; and FIG. 6 is an end view of a gauging fixture dimensioned to accept a cell of a different configuration.

Corresponding reference numerals refer to like parts throughout the several views of the drawings.

DETAILED DESCRIPTION

Figure 1:
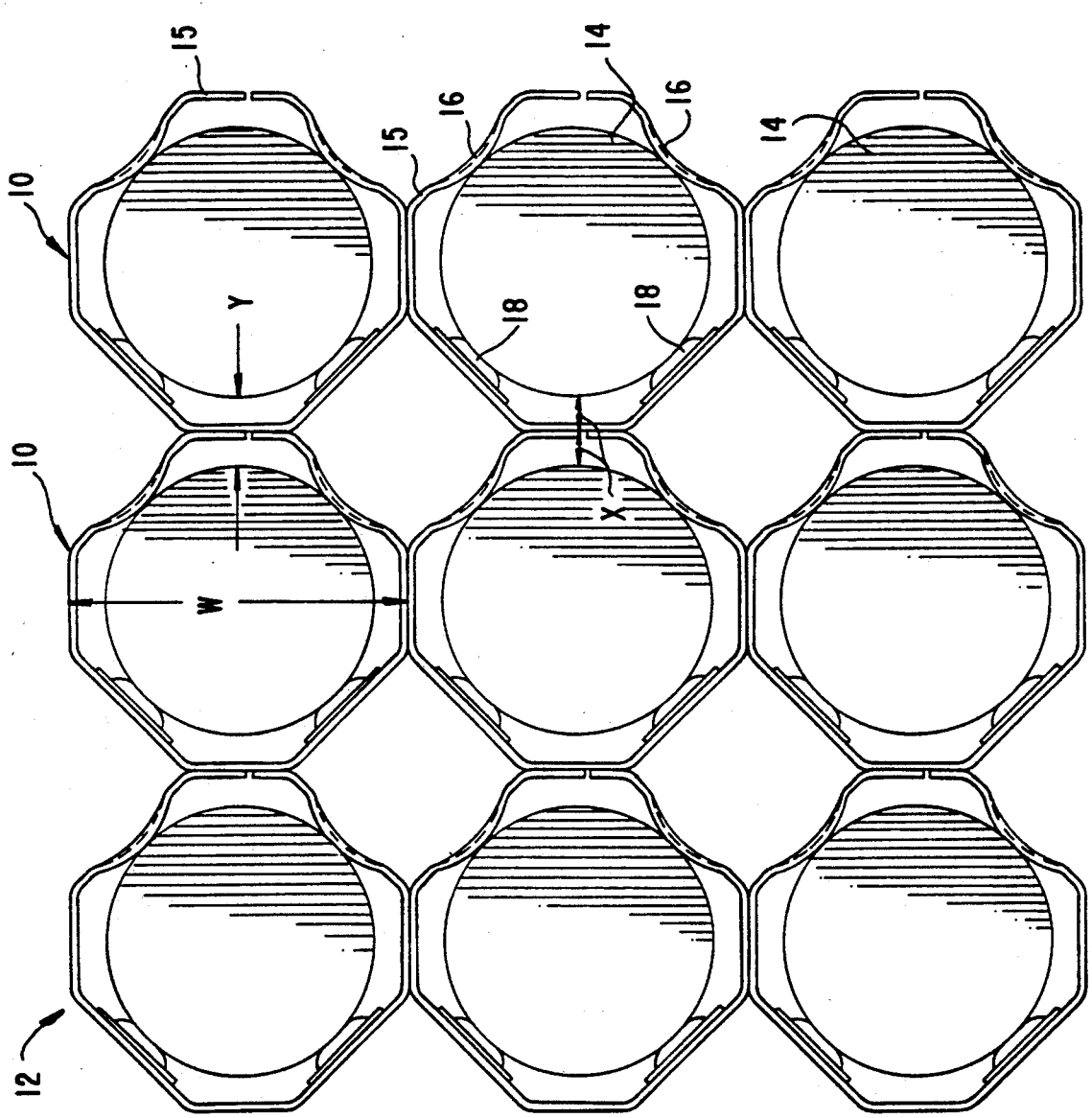
FIG. 1 is a fragmentary plan view of nuclear fuel bundle spacer including a plurality of cells in which fuel rods are positioned.

The gauging apparatus of the present invention is applied in its embodiment to check the critical dimensional characteristics of cells 10 utilized in a nuclear fuel bundle spacer, generally indicated at 12 in FIG. 1, to establish the spacings between fuel rods 14 making up the bundle. Each cell may be of the type disclosed in commonly assigned, copending application entitled "Composite Spacer With Inconel grid and Zircaloy Band", U.S. Pat. No. 5,089,221, issued Feb. 18, 1991. As such, each cell is constructed having octagonally shaped end bands 15 interconnected by a pair of resilient legs which serve as springs 18. Two flat panels of each of the end bands are formed ends with inwardly projecting stops 16 in diametrically opposed relation to springs 18. When a fuel rod 14 is inserted through the cell, the springs act to bias the fuel rod against stops 16 to center it in the cell. When the cells are conjoined in matrix or egg crate array to create spacer 12, the stops of the multiplicity of cells also establish the spacings between fuel rods 14. Since rod to rod spacing Y in a fuel bundle is a critical dimension, the dimensional characteristics of the individual cells that contribute to the establishment of this spacing must be held to strict tolerances. The gauging apparatus of the present invention provides a convenient quality assurance check of these critical cell dimensional characteristics.

Figure 2:
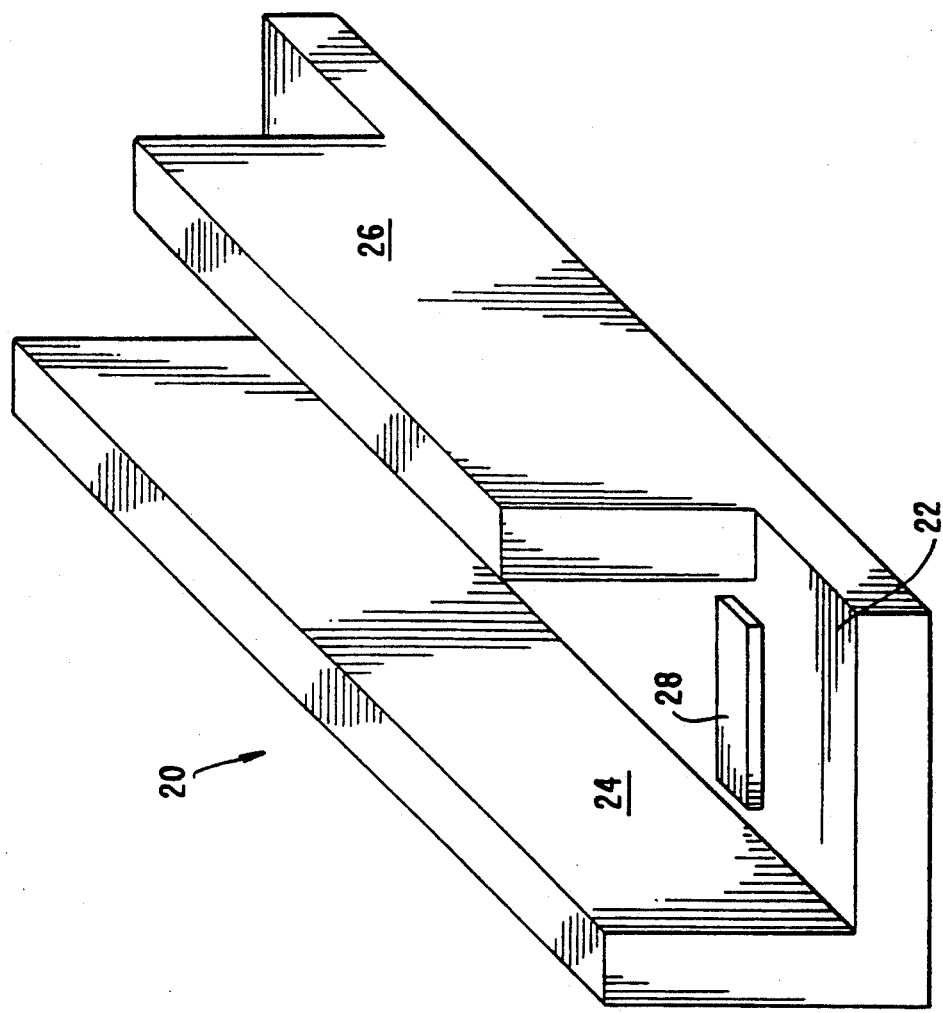
FIG. 2 is a perspective view of a fixture utilized in the apparatus of the present invention for gauging the dimensional characteristics of an individual cell to be incorporated in the spacer of FIG. 1.

Turning to FIG. 2, the gauging apparatus of the invention includes a fixture, generally indicated 20, having a planar base 22 and a pair of upstanding, parallel sidewalls 24 and 26 in perpendicular relation to the base. As seen in FIGS. 3 and 5, the separation W between the sidewalls is equal to the nominal cell width measured between diametrically opposed flat panels of the cell end bands 15, and the sidewall height is also equal to dimension W. To gauge the dimensional characteristics of a cell, it is placed in fixture 20. The corrected gauging position of the cell in the fixture is with the flat panels of the cell end bands between the two stop- containing panels resting squarely on fixture base 22. If it fits between sidewalls 24 and 26 with minimal play, its width dimension W in the horizontal direction is accepted. To check cell width W in the vertical direction, a plate 36 is placed across the tops of the fixture sidewalls 24, 26. If the cell fits between this plate and fixture base 22 with minimal play, this width dimension is accepted. As best seen in FIGURE 4, a pair of steps 28, upstanding from the fixture base, are separated by a distance L that is slightly greater than the nominal length of a cell. If a cell can assume a gauging position between steps 28 with minimal gaps between the cell ends and these steps, its length is considered acceptable.

Referring to FIGS. 3 and 4, a pin 30 is then inserted though the cell bore defined by end bands 15. This pin is semicylinderical, such that its cylindrical surface portion 30a rests on stops 16 with its flat surface portion 30b well clear of springs 18 which are seen to be in their relaxed states. Thus, the springs do not press pin 30 against the stops, which would tend to distort the essentially free standing cell. The diameter of the cylindrical portion of pin 30 is equal to the nominal diameter of a fuel rod. It will be appreciated that such distortion can not occur when the cells are conjoined in spacer array. As seen in FIG. 1, the orientations of the cells in the spacer are such that only the flat band panels of adjacent cells are joined in abutting relation. Thus, it is the gap X between a fuel rod 14 and the exterior flat panel surface that establishes critical fuel rod spacing Y and in fact equals Y/2. Therefore, gap X established by stops 16 is a critical cell dimensional characteristic.

To check this critical dimension, a pair of "go, no go" feeler gauges 32 and 34, seen in FIG. 4, are utilized. Feeler gauge 32 has a thickness equal to the minimum allowable gap X dimension, while feeler gauge 34 has a thickness slightly larger than the maximum allowable gap X dimension. Thus, if feeler gauge 32 can not be inserted through the gaps X between pin 30 and the fixture base and sidewalls, the minimum allowable gap dimensional requirement is not met, and the cell is disqualified. On the other hand, if feeler gauge 34 can be inserted through any one of the gaps, the cell fails the maximum allowable gap dimension requirement and is rejected. These gap dimensions are checked by the feeler gauges just beyond both ends of the cell, and fixture sidewall 26 is relieved, as indicated at 26a in FIG. 4, to facilitate introduction of the gauges. In practice, it is only necessary to gauge the gaps between the pin and the fixture base and between the pin and one fixture sidewall. If these gaps are in-tolerance, then the gaps between a fuel rod and the exterior surfaces of respectively diametrically opposed flat panels of the end bands 15 will also be in-tolerance. A fuel rod will thus be essentially centered in the cell, as is required to achieve requisite rod spacing throughout the spacer.

Referring to FIG. 5, if the quality assurance checks of the flat panel gaps X indicate their dimensions to be in-tolerance, it remains to check the relaxed positions of the springs 18 as a gauge of whether they will exert adequate spring force to bias a fuel rod into a centered position in the cell against stops 16. To this end, plate 36 is placed across the top of fixture 20 to fully confine and thus maintain the shape of the cell, and a cylindrical pin 38 is then inserted through the cell to rest on stops 16. The diameter of this pin is selected to be sufficiently less than the fuel rod nominal diameter, such that springs 18 should lightly contact pin 38. If they do, it is determined that the springs, as formed, are in requisite relaxed positions to exert adequate centering forces on a fuel rod when inserted through the cell. However, if the springs do not contact pin 38, the cell is rejected for defective springs.

FIG. 6 illustrates a gauging fixture 44 dimensioned such that separation W between its sidewalls 46 is equal to the nominal width, i.e., diameter, of a tubular spacer cell 48, such as disclosed in commonly assigned Matzner et al. U.S. Pat. No. 4,508,679. The height W of the sidewalls, measured from base 50, is also equal to the nominal cell diameter. Thus, when a cell 48 is placed in fixture 44, the sidewalls serve as a gauge of the cell diameter, as does a plate 50 resting on the top edges of the sidewalls. A pin 52 of a diameter equal to the nominal diameter of a fuel rod is inserted through the cell bore to rest on stops 54. "GO, no go" feeler gauges are then utilized to check the gaps between pin 52 and the base and between the pin and at least one sidewall of the fixture. Steps 28 on fixture base 50 gauge the cell length.

The present invention thus provides gauging apparatus for facilitating the quality assurance inspection of individual spacer cells to determine that their dimensional characteristics are such that requisite fuel rod spacing will be achieved when the cells are assembled in a spacer array. With frequent utilization of the gauging apparatus, excursions in the cell manufacturing process trending toward out-of-tolerance fuel rod spacings can be detected early and corrected. The gauging apparatus can also play a role in refining the tooling to emphasize accuracy in imparting those dimensional characteristics to the cell that are critical to achieving acceptable fuel rod spacing.

It is seen from the foregoing that the objectives set forth, including those made apparent from the preceding Detailed Description, are efficiently attained, and, since certain changes may be made in the construction set forth without departing from the scope of the invention, it is intended that all matters of detail be taken as illustrative and not in a limiting sense.

Having described the invention, what is claimed as new and desired to secure by Letters Patent is:

1. Apparatus for gauging the dimensional characteristics of cells incorporated in spacers utilized in nuclear fuel bundles to establish critical spacings between fuel rods, said apparatus comprising, in combination:

A. a fixture having a base and a pair of sidewalls separated by a distance equal to a nominal width dimension of the cells, whereby said sidewalls provide a width dimension gauge when a cell is placed in a gauging position resting on said base between said sidewalls;

B. a pin for insertion through a cell in said gauging position to rest on a pair of stops formed in the cell, said pin having a diameter equal to the nominal diameter of a fuel rod; and C. at least one feeler gauge for insertion through gaps between said pin and each of said base and at least one of said sidewalls to determine whether the dimensional characteristics of the cell will establish the critical fuel rod spacing when incorporated in a spacer.

2. The apparatus defined in claim 1, which further includes first and second said feeler gauges, said first feeler gauge having a width slightly greater than a maximum allowable gap dimension, and said second feeler gauge having a width equal to a minimum allowable gap dimension.

3. The apparatus defined in claim 2, wherein the height of said sidewalls, measured from said base, is equal to the nominal width dimension of the cells, said apparatus further including a plate resting on said sidewalls in overlying relation with a cell in said gauging position.

4. The apparatus defined in claim 2, which further includes steps positioned on said base in spaced relation to gauge the length of a cell in said gauging position.

5. The apparatus defined in claim 2, wherein the cells include springs positioned in diametrically opposed relation to the stops, and said pin is of a semicylindrical configuration having a cylindrical surface portion resting on the stops and a flat surface portion disposed in non-contacting relation with the springs.

6. The apparatus defined in claim 5, wherein the height of said sidewalls, measured from said base, is equal to the nominal width dimension of the cells, said apparatus further including a plate resting on said sidewalls in overlying relation with a cell in said gauging position, a second cylindrical pin for insertion through the cell to rest on the stops, said second pin having a diameter such that the springs, in their relaxed positions, should contact said second pin.

7. The apparatus defined in claim 6, which further includes steps positioned on said base in spaced relation to gauge the length of a cell in said gauging position.

* * * * *